(12) United States Patent
Shiraishi et al.

(10) Patent No.: US 6,670,414 B2
(45) Date of Patent: Dec. 30, 2003

(54) BINDER RESIN COMPOSITION AND USES THEREOF

(75) Inventors: Kazunori Shiraishi, Iwakuni (JP); Naosuke Komoto, Iwakuni (JP); Takaaki Ueda, Iwakuni (JP); Keiji Urata, Iwakuni (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 09/968,031

(22) Filed: Oct. 2, 2001

(65) Prior Publication Data

US 2003/0096907 A1 May 22, 2003

(51) Int. Cl.$^7$ .............................. C08K 3/08; C08K 3/10
(52) U.S. Cl. .................... 524/437; 428/328; 428/424.4; 428/516; 524/476; 524/501; 524/504; 524/517; 524/519; 524/522; 525/192; 525/207; 525/214; 525/221
(58) Field of Search ................................. 524/501, 504, 524/522, 437, 476, 517, 519; 525/192, 214, 221, 207; 428/328, 424.4, 516

(56) References Cited

U.S. PATENT DOCUMENTS

| | | | | |
|---|---|---|---|---|
| 3,579,485 A | * | 5/1971 | Folzenlogen et al. | 525/285 |
| 3,625,727 A | * | 12/1971 | Lightfoot et al. | 427/156 |
| 4,486,559 A | * | 12/1984 | Murata et al. | 523/468 |
| 4,535,126 A | * | 8/1985 | Iida | 525/106 |
| 4,755,553 A | * | 7/1988 | Kishimura et al. | 524/531 |
| 4,863,988 A | * | 9/1989 | Inagaki et al. | 524/315 |
| RE34,066 E | * | 9/1992 | Yamamoto et al. | 252/511 |

FOREIGN PATENT DOCUMENTS

| | | | | |
|---|---|---|---|---|
| JP | 57-73005 | | 5/1982 | |
| JP | 357073005 | * | 5/1982 | 525/285 |
| JP | 11-349325 | | 12/1999 | |

OTHER PUBLICATIONS

Patent Abstracts of Japan, JP 59–075958, Apr. 28, 1984.
Patent Abstracts of Japan, JP 60–223831, Aug. 8, 1985.
Patent Abstracts of Japan, JP 8–100032, Apr. 16, 1996.
Patent Abstracts of Japan, JP 10–204372, Aug. 4, 1998.
Patent Abstracts of Japan, JP 8–230113, Sep. 10, 1996.
Patent Abstracts of Japan, JP 8–90740, Apr. 9, 1996.
Patent Abstracts of Japan, JP 6–155692, Jun. 3, 1994.
Patent Abstracts of Japan, JP 8–198831, Jul. 19, 1994.
Patent Abstracts of Japan, JP 10–259367, Sep. 29, 1998.
Patent Abstracts of Japan, JP 8–001881, Jan. 9, 1996.

\* cited by examiner

*Primary Examiner*—Judy M. Reddick
(74) *Attorney, Agent, or Firm*—Oblon, Spivak, McClelland, Maier & Neustadt, P.C.

(57) ABSTRACT

A binder resin containing a mixture of carboxyl group containing chlorinated polyolefins and an ethylene-vinyl acetate copolymer. The binder resin is incorporated in primer formulations for application on substrates including polyolefinic materials.

18 Claims, No Drawings

BINDER RESIN COMPOSITION AND USES THEREOF

BACKGROUND OF THE INVENTION

1. Field of the Invention

The invention provides a binder resin composition that forms a coated film with excellent and well balanced adherence, water resistance, weather resistance and flexibility without primer treatment on the surface of polyolefinic resin moldings.

A binder resin composition containing a mixture of carboxyl group-containing chlorinated polyolefin (1) with 1 to 10 wt. % of grafting rate of at least one kind of unsaturated carboxylic acid monomer selected from carboxylic acids or carboxylic anhydrides and 5 to 50 wt. % of chlorine content, with ethylene-vinyl acetate copolymer (II).

2. Description of the Related Art

Because of high productivity, broad degree of freedom for design and many advantages such as light weight, corrosion and shock resistance, in recent years, plastics have been used broadly as the materials of choice for automotive parts, electrical parts, building materials, etc. Above all, because of low price and many excellent properties such as moldability, chemical resistance, heat resistance, water resistance and good electrical characteristics, polyolefinic resin moldings are used extensively as industrial materials, ranking them as one of the materials for which the growth of demand thereof is most expected in future. For example, polyolefinic resin moldings are used for prime materials of exterior parts such as bumper in automotive use and it is usual to paint the surface thereof to provide the design properties as well as improved weather resistance.

However, different from the moldings of synthetic resins with polarity such as polyurethane resin, polyamide resin, acrylic resin and polyester resin, polyolefinic resin moldings are nonpolar and crystalline, hence they have drawbacks such as poor paint adhesion. For this reason, an exclusive primer is coated prior to coating with base paint to enhance the adherence between base paint film and said prime materials and, as the case may be, to enhance the water resistance, then the base paint is coated thereon for weather resistance etc.

So far, for the primer, chlorinated polyolefin with strong adherence to polyolefinic resin moldings is used as a binder resin.

In recent years, aiming at the reduction of cost in painting process of automotive exterior parts, the development of base paints (hereinafter referred to as primeness base paint) capable of being used without coating the primer beforehand onto polyolefinic resin moldings is implemented. To obtain the primeness base paint, it is conceivable to formulate chlorinated polyolefin being a component contained in the primer with acrylic polyol that works to improve the weather resistance etc.

However, since the chlorinated polyolefin has poor tolerance to heat or ultraviolet rays, if formulating chlorinated polyolefin into base paint, then problems to deteriorate chlorinated polyolefin by heat or ultraviolet rays imposed directly or through clear film coated on the surface, and the like arise.

As described above, since the chlorinated polyolefin has poor tolerance to heat or ultraviolet rays, epoxy compounds containing glycidyl groups are added generally as stabilizers. However, only with epoxy compound as the only additive, the epoxy migrates out of the system over the time after formation of coated film, resulting in insufficient effect as a stabilizer.

To prevent the migration of epoxy compound, a method of reacting epoxy compound with chlorinated polyolefin is desirable. Primer compositions or base paint compositions with epoxy compounds reacted with chlorinated polyolefin are disclosed, for example, in Japanese Patent Publication Nos. Sho 63-50381 and Hei 1-16414, Japanese Unexamined Patent Publication No. Hei 8-100032, etc. In these, epoxy compound is added to carboxyl group-containing chlorinated polyolefin obtainable by graft polymerizing unsaturated carboxylic acid or its anhydride onto polyolefin, followed by chlorination, which is then painted onto polyolefinic resin moldings and then the carboxyl group is reacted with epoxy compound, or carboxyl group and epoxy compound are reacted beforehand in the presence of a catalyst such as tertiary amine or tin compound, which is then painted.

Among these compositions, however, in the case of epoxy compound added and painted, because of poor reactivity between carboxyl group and epoxy compound, the epoxy compound is liable to migrate out of system over the time, resulting in insufficient stability to heat or ultraviolet rays. While, in the case of reacting carboxyl group with epoxy compound beforehand in the presence of a catalyst such as tertiary amine or tin compound, followed by painting, carboxyl group and epoxy compound lead to crosslinking, resulting in poor adherence onto polyolefinic resin moldings. Further, to solve this, in Japanese Unexamined Patent Publication No. Hei 10-204372, a binder resin composition, in which a monomer with ethylenic unsaturated bond and glycidyl group is graft polymerized onto carboxyl group-containing chlorinated polyolefin, is provided. Although this was an effective composition for preventing the migration of epoxy out of system, it was not enough in the point of the flexibility of coated film, and required the use of a flexible resin in combination. However, because of poor compatibility of chlorinated polyolefin with flexible resin, there was a problem of deteriorated storage stability of paint.

On the other hand, the polyolefin resin has been used broadly as a prime material replaceable vinyl chloride resin. For example, for the decorative sheet to be used as a decorative laminate by laminating on the surface of woody board, inorganic board and metal plate with adhesive, vinyl chloride sheet with excellent flexibility, embossing property, contamination resistance, etc. has seen broad application, but, since vinyl chloride resin can cause incinerator corrosion and acid rain due to hydrogen chloride gas at the time of incineration, thermoplastic polyolefin resins such as polypropylene and polyethylene are investigated as alternative resins (Japanese Unexamined Patent Publication Nos. Hei 8-230113, Hei 8-90740, Hei 8-1181, Hei 6-155692 and Hei 6-198831). For the adhesives to be used in their place, urethane-based, polyester-based and aqueous acrylic emulsion-based adhesives for polyolefin are mentioned, but currently, even if these adhesives are used, sufficient adhesive strength has not been obtained.

Moreover, the inventors have proposed an adhesive for polyolefin sheets previously in Japanese Unexamined Patent Publication No. Hei 9-64227. This had good adhesiveness onto some polyolefin sheets, but the adhesiveness onto various sheets was insufficient.

SUMMARY OF THE INVENTION

The purpose of the invention is to provide a binder resin composition that can be painted directly onto the surface of polyolefinic resin moldings, without primer treatment, and exhibits excellent adherence, flexibility, water resistance and weather resistance and is well balanced in these physical properties, a primer and base paint for polyolefinic resin moldings and an adhesive for polyolefinic sheets.

As a result of diligent studies to solve said aforementioned problems, the inventors have found that a composition comprising a mixture of carboxyl group-containing chlorinated polyolefin (I) with 1 to 10 wt. % of grafting rate of at least one kind of unsaturated carboxylic acid monomer selected from carboxylic acids or carboxylic anhydrides to raw material polyolefin and 5 to 50 wt. % of chlorine content, with ethylene-vinyl acetate copolymer (II) can solve said subject.

The invention relates to a binder resin composition to be used for the purpose of protecting or enhancing the appearance of polyolefinic resins, for example, polypropylene, polyethylene, ethylene-propylene copolymer, ethylene-propylene-diene copolymer, ethylene-vinyl acetate copolymer, etc., and, in more detail, it relates to a composition to be used as a binder resin for primer and base paint with excellent adherence and other physical properties onto polyolefin sheets, films and moldings.

Moreover, it relates to an adhesive with excellent adhesive strength on heat pressing a printed or colored film onto polyolefinic resin sheet, when producing printed or colored polyolefinic decorative sheet.

DETAILED DESCRIPTION OF THE INVENTION

The binder resin composition of the invention has a mixture of carboxyl group-containing chlorinated polyolefin (I) with ethylene-vinyl acetate copolymer (II) as a major component. In following, each component, solvents and additives will be explained in detail.

The carboxyl group-containing chlorinated polyolefin (I) to be used in the invention can be produced easily by employing the publicly known method.

For example, it can be obtained by heat melting polyolefin, by reducing viscosity or degradating by thermal decomposition, if need be, by graft polymerizing 1 to 10 wt. % of unsaturated carboxylic acid monomer being carboxylic acid or carboxylic anhydride to raw material polyolefin batchwise or continuously in the presence of a radical generator, followed by dispersing or dissolving it into a medium such as water, carbon tetrachloride or chloroform, and by blowing chlorine gas at a temperature range of 50 to 120° C. under pressure or ambient pressure in the presence of radical-generating catalyst or under irradiation of ultraviolet rays to react.

Moreover, it can also be obtained by chlorinating polyolefin beforehand by said method, then by graft polymerizing carboxylic acid or carboxylic anhydride in the presence of a radical generator.

As the raw material polyolefins, crystalline polypropylene, noncrystalline polypropylene, propylene-α-olefin copolymer, etc. can be used solely or by mixing two or more kinds of them. In the case of the base paint using the inventive resin composition, however, crystalline polypropylene with weight average molecular weight of 10,000 to 100,000 or propylene-α-olefin copolymer with weight average molecular weight of 10,000 to 100,000 and with propylene component contained of 50 to 97 mol %, wherein, as a unit of said α-olefin, at least one kind of α-olefin with number of carbon atoms of 2 or 4 to 6 selected from, for example, ethylene, 1-butane, 1-pentene, 4-methyl-1-pentene, 3-methyl-1-pentene and 1-hexane, is preferable from the point of workability or adhesiveness.

If the weight average molecular weight of raw material polyolefin is under 10,000, or the propylene component is under 50 mol %, then the adherence onto polyolefinic resin moldings and polyolefinic sheets tends to become insufficient, and, if the weight average molecular weight is over 100,000, then the paint is difficult to become fine particles when painting with air spray etc., thereby sometimes spoiling the beautiful appearance of painted surface, which is unpreferable. Also, if the number of carbon atoms of α-olefin in propylene-α-olefin copolymer exceeds 6, then the adherence onto polyolefinic resin moldings and polyolefinic sheets tends to become insufficient.

The chlorine content of carboxyl group-containing chlorinated polyolefin (I) is 5 to 50 wt. % and preferable is 15 to 27 wt. %. If under 5 wt. %, then the solubility into solvent becomes poor and, if over 50 wt. %, the adherence onto polyolefinic resin moldings and polyolefinic sheets becomes poor.

The unsaturated carboxylic acid monomers used to introduce carboxyl group include acrylic acid, methacrylic acid, maleic acid, maleic anhydride, fumaric acid, itaconic acid, itaconic anhydride, aconitic acid and aconitic anhydride. The grafting polymerization rate is 1 to 10 wt. % to raw material polyolefin and preferable is 3 to 5 wt. %, if under 1%, then the adherence onto upper paint becomes poor and, if over 10%, the adherence onto polyolefinic resin moldings and polyolefinic sheets becomes poor.

The radical generators to be used for the grafting polymerization reaction include, for example, peroxides such as di-tert-butyl peroxide, tert-butyl hydroperoxide, dicumyl peroxide, benzoyl peroxide, tert-butyl peroxide benzoate, methyl ethyl ketone peroxide and di-tert-butyl diperphthalate, and azonitriles such as azobisisobutylisonitrile.

The solvents to dissolve carboxyl group-containing chlorinated polyolefin (I) may be common solvents, but the formulation of aromatic solvents such as toluene and xylene is preferable. Besides, ester solvents such as ethyl acetate and butyl acetate, ketonic solvents such as methyl ethyl ketone and methyl isobutyl ketone, aliphatic solvents such as n-hexane and heptane, cyclic aliphatic solvents such as cyclohexane, methylcyclohexane and ethylcyclohexane may be used in combination.

When using ethylene-vinyl acetate copolymer for base paint, primer, adhesive or the like, it was normally used after chlorinating ethylene-vinyl acetate copolymer from the aspects of solvent-solubility and paintability. However, since the ethylene-vinyl acetate copolymer (II) to be used in the invention is used without chlorination, the base paint, primer or adhesive that uses the inventive binder resin composition is excellent in weather resistance.

The ethylene-vinyl acetate copolymer (II) to be used in the invention can be produced easily by employing the publicly known method. For example, ethylene gas is charged into an autoclave under high pressure, vinyl acetate is introduced under pressure in the presence of radical generator, and the reaction is conducted further by raising the temperature to 150° C. under high pressure. The resulting polymer is precipitated with methanol and dried.

For the inventive ethylene-vinyl acetate copolymer (II), regular ethylene-vinyl acetate copolymer can be used, but such one that the vinyl acetate content is 25 to 50 wt. % and the melt flow rate (JIS K7210) is 100 to 500 g/10 min is preferable. If the vinyl acetate content becomes under 25 wt.

%, then the solubility into organic solvent becomes somewhat insufficient and, if it becomes over 50 wt. %, the adherence onto polyolefinic resin moldings and polyolefinic sheets becomes a little insufficient. Moreover, if the melt flow rate being an index of molecular weight of ethylene-vinyl acetate copolymer (II) is less than 100 g/10 min, then the solubility into organic solvent becomes somewhat insufficient and, if it is more than 500 g/10 min, the adherence onto polyolefinic resin moldings and polyolefinic sheets becomes a little insufficient The melt flow rate can be adjusted through the quantity of radical generator used for the copolymerization reaction. When the quantity of radical, generator is high, the molecular weight becomes low, resulting in a high value of melt flow rate. While, when the quantity of radical generator is low, the molecular weight becomes high, resulting in a low value of melt flow rate.

For the radical generator to be used for copolymerization reaction, the same one as the radical generator to be used for carboxyl group-containing chlorinated polyolefin (I) can be used.

For the solvent to dissolve ethylene-vinyl acetate copolymer (II), the same solvent as for carboxyl group-containing chlorinated polyolefin (I) can be used. More preferably, if using aromatic solvents such as toluene and xylene and cyclic aliphatic solvents such as cyclohexane, methylcyclohexane and ethylcyclohexane at a weight ratio of 90/10 to 60/40, the preservation stability can be improved.

The binder resin composition of the invention has a mixture of carboxyl group-containing chlorinated polyolefin (I) with the ethylene-vinyl acetate copolymer (II) described above as a major component, and preferably, the weight ratio is I/II=90/10–10/90, more preferably, 75/25–25/75. If carboxyl group-containing chlorinated polyolefin (I) is under 10, then the adherence onto polyolefinic resin moldings and polyolefinic sheets becomes somewhat insufficient and, if over 90, the weather resistance and flexibility become a little insufficient.

The mixture comprising aforementioned resins (I) and (II) shows balanced physical properties of coated film and adhesiveness by itself. As the case may be, alkyd resin, acrylic resin, polyacrylicpolyol, polyester resin, polyesterpolyol, polyether resin, polyetherpolyol, polyurethane resin, epoxy resin, etc. may be added in amounts of 1 to 49 wt. % (solids) to overall binder resin. There is no harm in any way, if using within a range of not injuring the effect of the invention.

The binder resin composition of the invention can be used by dissolving into 50 to 10,000 parts by weight of solvent to 100 parts by weight of resin composition. The organic solvents to be used may be common solvents.

The binder resin composition of the invention can be used suitably as a base paint. For example, aluminum paste and coloring pigment are added to a solution containing the inventive binder resin composition and, if need be, other additives, for example, ultraviolet absorber, antioxidant and sedimentation preventer for pigment (3 to 50 wt. % to overall binder resin), then the mixture is kneaded for 1 to 3 hours in a sand grinder mill or the like, and solvent is added so as the viscosity of paint through Ford cup No.4 to become 13 to 14 sec/20° C. for viscosity adjustment, thereby allowing to produce a base paint such as metallic effect.

Moreover, even if using as a primer resin as it is, the binder resin composition of the invention shows balanced physical properties of coated film and adhesiveness by itself, but, if need be, cyclised rubber, petroleum resin, coumarone-indene resin, chlorinated polyolefin resin, acrylic resin, alkyd resin, epoxy resin, etc. may be added within a range of not injuring the effect of the invention for use. Moreover, titanium dioxide, carbon black and other pigments, antioxidants ultraviolet absorber, light stabilizer and other additives, solvent, etc. may be added for use.

Moreover, the binder resin composition of the invention is also effective as an adhesive for polyolefinic sheets. The binder resin composition may be used as it is as an adhesive, but antioxidant, ultraviolet absorber, light stabilizer, blocking preventer and other additives may be added for use.

The inventive adhesive is used as an adhesive between substrate sheet comprising polyolefinic resin provided with printing and polyolefinic transparent resin sheet to be laminated for protecting the printed surface of substrate sheet or for enhancing the design properties through embossing processing.

For the polyolefinic substrate sheets and the polyolefinic transparent sheets, polypropylene homopolymer, random polymerization polymer or block polymerization polymer of propylene-$\alpha$-olefin copolymer, etc., or a resin with low-density polyethylene or ethylene-propylene copolymer rubber mixed with these resins as a softening component, ethylenevinyl acetate copolymerization resin, or a resin of partially saponified ethylene-vinyl acetate copolymerization resin, a sheet with layer structure produced by laminating or coextruding these resins to two layers or more layers, and the like can be used.

To increase the adherence of printing ink onto substrate sheet and the adhesiveness of transparent sheet, corona treatment may be provided at the bonding surface.

Moreover, the effect of the inventive adhesive resin composition does not change, if using by coating onto either side of printed surface of printed substrate sheet and bonding surface of transparent resin sheet.

Moreover, the lamination of transparent film onto substrate sheet can be implemented even by the common method such as dry lamination method, wherein polyolefin film such as polypropylene molded into film form beforehand is laminated.

The heat pressing of film can be implemented by the common method such as laminating adhesion with hot roll or adhesion with hot press.

Japanese Applications JP 011-008 895 and 011-349 325 are incorporated herein in their entirety by reference.

In following, the invention will be illustrated concretely based on examples, but the invention is not confined to these.

1. Grafting Rate of Unsaturated Carboxylic Acid Monomer

The acid value of carboxyl group-containing chlorinated polyolefin graft polymerized with unsaturated carboxylic acid monomer was measured according to JIS K5407 and converted to the amount of unsaturated carboxylic acid. The grafting rate (%) was calculated from following formula.

$$\text{Grafting rate } (\%) = \frac{\text{Weight of unsaturated carboxylic acid grafted}}{\text{Weight of raw material polyolefin}} \times 100$$

2. Chlorine Content

According to JIS K7229, the chlorine content (%) was measured from following formula.

$$\text{Chlorine content (\%)} = \frac{(A-B) \times F}{S} \times 100$$

A: Quantity of 0.0282N silver nitrate solution required for titrating sample (ml)
B: Quantity of 0.0282N silver nitrate solution required for titrating blank sample (ml)
F: Titer of 0.0282N silver nitrate solution
S: Mass of resin sample (mg)

3. Melt Flow Rate
Measurement was made according to JIS K7210.

4. Weight Average Molecular Weight
Measurement was made by gel permeation chromatography (GPC), using polystyrene resin as a standard.

5. Viscosity of Paint
Measurement was made according to Ford cup No.4 method of paragraph 4.5.4, JIS K5400.

Trial Example 1

In a four-neck flask attached with stirrer, cooling pipe, thermometer and dropping funnel, 500 g of isotactic polypropylene were heated to 200° C. to melt. After nitrogen replacement in the flask was performed for 10 minutes, 25 g of maleic anhydride were charged over about 5 minutes while stirring and 2 g of di-t-butyl peroxide were added dropwise over about 30 minutes as a radical generator. After continued the reaction further for 30 minutes, unreacted maleic anhydride was removed while reducing pressure in the flask by aspirator. The grafting rate of maleic anhydride of this product was 4.4 wt. %. Next, this product was charged into a glass-lined reactor and 5L of chloroform were added to dissolve sufficiently at 100° C. under a pressure of 2 kg/cm$^2$. Then, while irradiating ultraviolet rays, gaseous chlorine was blown-in from the bottom of reactor, until the chlorine content became 22.2 wt. %. After completion of the reaction, 24 g of stabilizer were added and chloroform being solvent was distilled off by evaporator and replaced with toluene/cyclohexane=70/30 (wt. ratio) to obtain a 20 wt. % solution of maleic anhydride-modified chlorinated polyolefin (I-1). The weight average molecular weight of this resin was 56000.

Trial Example 2

Similarly to Trial example 1, 30 g of maleic anhydride were graft polymerized onto 500 g of isotactic polypropylene. The grafting rate of maleic anhydride of product was 5.0 wt. %. Next, this product was charged into a glass-lined reactor and 5L of chloroform were added. After dissolved sufficiently at 100° C. under a pressure of 2 kg/cm$^2$, while irradiating ultraviolet rays, gaseous chlorine was blown-in from the bottom of reactor, until the chlorine content became 24.6 wt. %. After completion of the reaction, 24 g of stabilizer were added and the mixture was fed to a vented extruder equipped with solvent-removing suction part at screw shaft section to remove solvent and to solidify. The solid product thus obtained was dissolved into a mixed solution with solvent composition being toluene/cyclohexane=50/50 (wt. ratio) to obtain a 20 wt. % solution of maleic anhydride-modified chlorinated polyolefin (I-2). The weight average molecular weight of this resin was 70000.

Trial Example 3

In a four-neck flask attached with stirrer, cooling pipe, thermometer and dropping funnel, 5 kg of isotactic polypropylene were heated to 200° C. to melt. After nitrogen replacement in the flask was performed for 10 minutes, 200 g of maleic anhydride were charged over about 5 minutes while stirring and 20 g of di-t-butyl peroxide were added dropwise over about 30 minutes as a radical generator. After continued the reaction further for 30 minutes, unreacted maleic anhydride was removed while reducing pressure in the flask by aspirator. The grafting rate of maleic anhydride of this product was 4.4 wt. %. Next, this product was charged into a glass-lined reactor and 80L of chloroform were added to dissolve sufficiently at 100° C. under a pressure of 2 kg/cm$^2$. Then, while irradiating ultraviolet rays, gaseous chlorine was blown-in from the bottom of reactor, until the chlorine content became 22 wt. %. After completion of the reaction, chloroform being solvent was distilled off by evaporator and replaced with toluene to obtain a 30 wt. % toluene solution of maleic anhydride-modified chlorinated polyolefin (I-3). Next, 1 kg of this (I-3) was charged into a four-neck flask attached with stirrer, thermometer, dropping funnel and cooling pipe to reflux monomer, the inside of flask was replaced with nitrogen, and, while stirring at 90° C., 3 g of benzoyl peroxide were added, which was stirred for about 30 minutes. Next, 40 g of glycidyl methacrylate were charged from dropping funnel over about 60 minutes and reacted further for 3 hours, followed by concentration adjustment, to obtain a toluene solution of acrylic-modified chlorinated polyolefin (solids 20%) with monomer having ethylenic unsaturated bond graft copolymerized (III). The product obtained is same as one described in Japanese Unexamined Patent Publication No. Hai 10-204372.

Trial Example 4

After ethylene gas was introduced to and discharged from an autoclave with electromagnetic stirrer twice under pressure, it was filled up at 500×10$^5$ Pa (3.47 mol), and 0.04 g (2.7×10$^{-4}$ mol) of di-t-butyl peroxide and 35.4 g (0.41 mol) of vinyl acetate were introduced under pressure. Both the temperature and pressure were raised to 150° C. and 750×10$^5$ Pa, respectively, and the mixture was stirred for 30 minutes to observe the pressure reduction. This was transferred to a large-volume cylinder with cooling trap for collection and the polymer produced was precipitated with methanol and dried to obtain ethylene-vinyl acetate copolymer with vinyl acetate content of 30 wt. % and melt flow rate of 400 g/10 min (II-1). This was adjusted to a 20 wt. % solution with solvent of toluene/cyclohexane=70/30 (wt. ratio).

Trial Example 5

After ethylene gas was introduced to and discharged from an autoclave with electromagnetic stirrer twice under pressure, it was filled up at 500×10$^5$ Pa (3.47 mol), and 0.02 g (1.4×10$^{-4}$ mol) of di-t-butyl peroxide and 53.1 g (0.62 mol) of vinyl acetate were introduced under pressure. Both the temperature and pressure were raised to 150° C. and 750×10$^5$ Pa, respectively, and the mixture was stirred for 30 minutes to observe the pressure reduction. This was transferred to a large-volume cylinder with cooling trap for collection and the polymer produced was precipitated with methanol and dried to obtain ethylene-vinyl acetate copolymer with vinyl acetate content of 45 wt. % and melt flow rate of 150 g/10 min (II-2). This was adjusted to a 20 wt. % solution with solvent of toluene/cyclohexane=70/30 (wt. ratio).

EXAMPLE 1

Seventy-five g of 20 wt. % solution (solvent composition: toluene/cyclohexane=70/30 (wt. ratio)) of (I-1) obtained in Trial example 1, 25 g of 20 wt. % solution (solvent composition: toluene/cyclohexane=70/30 (wt. ratio)) of (II-1) obtained in Trial example 4 and 3 g of aluminum paste were mixed and viscosity adjustment was performed by adding xylene so as the viscosity of paint through Ford cup No.4 to become 13 to 14 sec/20° C. to prepare a paint. This was spray painted onto a polypropylene plate washed with water so as the film thickness to become 15 μm. After several minutes, a clear paint (two-component cure type urethane paint) was spray painted thereon so as the film thickness to become 30 to 40 μm. After dried for about 15 minutes at room temperature, this was dried forcedly for 30 minutes at 80° C. and, after allowed to stand further for 1 day at room temperature, the coated film was tested. The binder resin formulation of base paint and the test results of coated film are shown in Table 1.

EXAMPLES 2 THROUGH 10

Base paints were fabricated by the same method as in Example 1 at formulating proportions shown in Table 1, and the coated films were tested. The test results are shown in Table 1.

Comparative Examples 1 through 5

Each 100 g of the solutions of chlorinated polyolefin (I-1) fabricated in Trial example 1, chlorinated polyolefin (I-2) fabricated in Trial example 2, ethylene-vinyl acetate copolymer (II-1) fabricated in Trial example 4, ethylene-vinyl acetate copolymer (II-2) fabricated in Trial example 5 and acrylic-modified chlorinated polyolefin (III) fabricated in Trial example 3 and 3 g of aluminum paste were mixed and base paints were fabricated by the same method as in Example 1 to test the coated films. The formulating proportions and the test results are shown in Table 1.

EXAMPLE 11

To 75 g of 20 wt. % solution (solvent composition: toluene/cyclohexane=70/30 (wt, ratio)) of (I-1) obtained in Trial example 1 and 25 g of 20 wt. % solution (solvent composition: toluene/cyclohexane=70/30 (wt. ratio)) of (II-1) obtained in Trial example 4 were added 10 g of titanium dioxide, and the mixture was kneaded for 3 hours in a sand mill. Then, viscosity adjustment was performed with xylene so as to become 13 to 15 sec/20° C. through No.4 Ford cup, and the primer was painted onto a polypropylene plate washed with water, using an air spray gun so as the film thickness to become about 10 μm. Next, two-component cure type urethane paint was painted thereon (film thickness: about 30 μm). After dried for 30 minutes at 80° C., this was allowed to stand for 24 hours at room temperature to evaluate the physical properties. The primer resin formulation and the test results of coated film are shown in Table 2.

EXAMPLES 12 through 18

Primers were fabricated by the same method as in Example 11 at formulating proportions shown in Table 2, and the coated films were tested. The test results are shown in Table 2.

Comparative Examples 6 and 7

To each 100 g of the chlorinated polyolefin (I-1) fabricated in Trial example 1 and the chlorinated polyolefin (I-2) fabricated in Trial example 2 were added 10 g of titanium dioxide, and primers were fabricated by the same method as in Example 11 to test the coated films. The formulating proportions and the test results are shown in Table 2.

TABLE 1

| (Parts by weight) | Example | | | | | | | | | | Comparative Example | | | | |
|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 |
| I-1 | 75 | 50 | 25 | | | | 75 | 25 | | | 100 | | | | |
| I-2 | | | | 75 | 50 | 25 | | | 75 | 25 | | 100 | | | |
| II-1 | 25 | 50 | 75 | 25 | 50 | 75 | | | | | | | 100 | | |
| II-2 | | | | | | | 25 | 75 | 25 | 75 | | | | 100 | |
| III | | | | | | | | | | | | | | | 100 |
| Aluminum paste | 3 | 3 | 3 | 3 | 3 | 3 | 3 | 3 | 3 | 3 | 3 | 3 | 3 | 3 | 3 |
| Physical property of coated film | | | | | | | | | | | | | | | |
| Adherence | ○ | ○ | ○ | ○ | ○ | ○ | ○ | ○ | ○ | ○ | ○ | ○ | X | X | ○ |
| Water resistance | ○ | ○ | ○ | ○ | ○ | ○ | ○ | ○ | ○ | ○ | ○ | ○ | X | X | ○ |
| Weather resistance | ○ | ○ | ○ | ○ | ○ | ○ | ○ | ○ | ○ | ○ | X | X | ○ | ○ | ○ |
| Flexibility | ○ | ○ | ○ | ○ | ○ | ○ | ○ | ○ | ○ | ○ | X | X | ○ | ○ | X |

TABLE 2

| (Parts by weight) | Example | | | | | | | | Comparative Example | |
|---|---|---|---|---|---|---|---|---|---|---|
| | 11 | 12 | 13 | 14 | 15 | 16 | 17 | 18 | 6 | 7 |
| I-1 | 75 | 50 | | | 75 | 25 | | | 100 | |
| I-2 | | | 75 | 50 | | | 75 | 25 | | 100 |
| II-1 | 25 | 50 | 25 | 50 | | | | | | |
| II-2 | | | | | 25 | 75 | 25 | 75 | | |
| Physical property of coated film | | | | | | | | | | |

TABLE 2-continued

| (Parts by weight) | Example | | | | | | | | Comparative Example | |
|---|---|---|---|---|---|---|---|---|---|---|
| | 11 | 12 | 13 | 14 | 15 | 16 | 17 | 18 | 6 | 7 |
| Adherence | ○ | ○ | ○ | ○ | ○ | ○ | ○ | ○ | ○ | ○ |
| Water resistance | ○ | ○ | ○ | ○ | ○ | ○ | ○ | ○ | ○ | ○ |
| Weather resistance | ○ | ○ | ○ | ○ | ○ | ○ | ○ | ○ | X | X |
| Flexibility | ○ | ○ | ○ | ○ | ○ | ○ | ○ | ○ | X | X |

EXAMPLE 19

Seventy-five g of 20 wt. % solution of chlorinated polyolefin (I-1) obtained in Trial example 1 and 25 g of 20 wt. % solution of ethylene-vinyl acetate (II-1) obtained in Trial example 4 were mixed and coated onto a polyolefinic resin sheet (sheet A) and a polypropylene/ethylene-vinyl acetate laminate sheet (sheet B) with #14 Meyer bar (resin thickness after drying: about 5 μm), which were dried overnight at room temperature. Onto the coated surface of these adhesives, another polyolefinic resin sheet (sheet A) and polypropylene/ethylene-vinyl acetate laminate sheet (sheet B) were superposed, respectively, and laminated through hot roll with roll temperature of 130° C. and line pressure of 5 kg/cm to measure the peeling strength of adhesion films. The results are shown in Table 3.

EXAMPLES 20 through 26

Adhesion films were fabricated by the same method as in Example 19 at formulating proportions shown in Table 3, and the peeling strength thereof was measured. The results are shown in Table 3.

Comparative Examples 8 and 9

From 20 wt. % solution of chlorinated polyolefin (I-1) obtained in Trial example 1 and 20 wt. % solution of chlorinated polyolefin (I-2) fabricated in Trial example 2, adhesive films were fabricated each independently by the same method as in example 19 to measure the peeling strength. The formulating proportions, and the test results are shown in Table 3.

| (Parts by weight) | Example | | | | | | | | Comparative example | |
|---|---|---|---|---|---|---|---|---|---|---|
| | 19 | 20 | 21 | 22 | 23 | 24 | 25 | 26 | 8 | 9 |
| I-1 | 75 | 65 | 75 | 65 | | | | | 100 | |
| I-1 | | | | | 75 | 65 | 75 | 65 | | 100 |
| II-1 | 25 | 35 | | | 25 | 35 | | | | |
| II-2 | | | 25 | 35 | | | 25 | 35 | | |
| Peeling strength (kg/25 nm) | | | | | | | | | | |
| Sheet A | 1.3 | 1.5 | 1.2 | 1.2 | 1.0 | 1.2 | 1.1 | 1.0 | 0.2 | 0.2 |
| Sheet B | 2.5 | 3.8 | 2.0 | 3.1 | 2.2 | 3.5 | 2.0 | 3.3 | 0.3 | 0.2 |

Evaluation Method of Coated Film
1. Adherence

According to JIS K5400, cross-cut cellotape peeling test was performed. Preparing 100 cross-cuts of 1 mm square, cellotape peeling test was performed and number of unpeeled cross-cuts was counted. The evaluation was made by marking with O, if the number of unpeeled cross-cuts was 100, and marking with x, if the number of unpeeled cross-cuts was 99 or fewer.

2. Water Resistance

After soaked painted polypropylene plate for 240 hours into warm water of 40° C., said cross-cut cellotape peeling test was performed. The evaluation was made by marking with O, if the number of unpeeled cross-cuts was 100, and marking with x, if the number of unpeeled cross-cuts was 99 or fewer.

3. Weather Resistance

After exposed painted polypropylene plate for 1500 hours using sunshine weathermeter, said cross-cut cellotape peeling test was performed. The evaluation was made by marking with O, if the number of unpeeled arose-cuts was 100, and marking with x, if the number of unpeeled cross-cuts was 99 or fewer.

4. Flexibility

After allowed painted polypropylene plate to stand for 1 hour in a freezer of −20° C., it was set quickly into DuPont's shock tester and a hard ball with 500 g was allowed to drop from a position of 50 cm height, making the level of polypropylene plate as a base. The evaluation was made by marking with O, if no cracks were caused in the coated film, and marking with x, if cracks were caused in the coated film.

Measuring Method of Peeling Strength
1. Peeling Strength

The peeling strength of decorative sheet obtained was measured by T peeling test, using Universal Tensile-Testing Machine (from Toyo Measuring Instruments Co., Ltd.). The peeling speed was set at 50 mm/min.

The binder resin compositions of the invention are excellent in the adherence, flexibility, water resistance and weather resistance and form coated films well balanced in these physical properties.

From the results in Table 1, base paints having the inventive binder resin compositions as major components, as in Examples 1 through 10, are excellent in the adherence, water resistance, flexibility and weather resistance over paints using binder resins of sole carboxyl group-containing chlorinated polyolefin, as in comparative examples 1 and 2, a paint using binder resin of sole chlorinated polyolefin with monomer having ethylenic unsaturated bond containing glycidyl group graft polymerized onto carboxyl group, containing chlorinated polyolefin, as in Comparative example 5, and paints using sole ethylene-vinyl acetate copolymer, as in Comparative examples 3 and 4, hence it can be seen that the resin compositions for base paints obtained according to the invention are useful for polyolefinic resin moldings.

From the results in Table 2, the physical properties of coated films of primers having the inventive binder resin compositions as major components, as in Examples 11 through 18, are excellent in the weather resistance and flexibility over the physical properties of coated films of primers fabricated with sole carboxyl group-containing chlorinated polyolefin, as in Comparative examples 6 and 7. Moreover, they also have good adherence and water resistance, hence it can be seen that the resin compositions obtained according to the invention are useful also as primers for polyolefinic resin moldings.

From the results in Table 3, when making the inventive binder resin compositions as major components and using as adhesives, as in Examples 19 through 26, the peeling strength of adhesion films between polyolefinic resin sheet (sheet A) or polyethylene/ethylene-vinyl acetate laminate sheet (sheet B) and polyolefinic resin sheet is higher in both cases of sheet A and sheet B over adhesion films with sole carboxyl group-containing chlorinated polyolefin, as in Comparative examples 8 and 9. It can be seen that the resin compositions obtained according to the invention are useful also as adhesives for polyolefinic resin sheets.

What is claimed is:

1. A binder resin composition comprising a mixture of carboxyl group-containing chlorinated polyolefin (I) and an ethylene-vinyl acetate copolymer (II), wherein said carboxyl group-containing chlorinated polyolefin (I) comprises from 1 to 10 wt. % of at least one unsaturated carboxylic acid monomer or carboxylic anhydride grafted to said carboxyl group-containing chlorinated polyolefin (I) and from 5 to 50 wt % chlorine, and wherein the melt flow rate of the ethylene-vinyl acetate copolymer (II) is from 150 to 400 g/10 min.

2. The binder resin composition of claim 1, wherein the weight ratio of the carboxyl group-containing chlorinated polyolefin (I) to the ethylene-vinyl acetate copolymer (II) is from 90/10 to 10/90.

3. The binder resin composition of claim 1, wherein the weight ratio of the carboxyl group-containing chlorinated polyolefin (I) to the ethylene-vinyl acetate copolymer (II) is from 75/25 to 25/75.

4. The binder resin composition claimed in claim 1, wherein the chlorine content of the of the carboxyl group-containing chlorinated polyolefin (I) is from 15 to 27% by weight.

5. A primer comprising the binder resin composition claimed in claim 1.

6. A base paint comprising the binder resin composition claimed in claim 1.

7. An adhesive for polyolefinic films or sheets comprising the binder resin composition claimed in claim 1.

8. The binder resin composition claimed in claim 1, wherein an unsaturated carboxylic acid monomer grafted to said carboxyl group-containing chlorinated polyolefin (I) is selected from the group consisting of acrylic acid, methacrylic acid, maleic acid, maleic anhydride, fumaric acid, itaconic acid, itaconic anhydride, aconitic acid and aconitic anhydride.

9. The binder resin composition of claim 1, wherein the ethylene-vinyl acetate copolymer (II) contains from 25 to 50 wt. % of a vinyl acetate.

10. The binder resin composition of claim 1, further comprising a solvent.

11. The binder resin composition of claim 10, wherein the solvent is a mixture of an aromatic hydrocarbon and a cyclic aliphatic hydrocarbon.

12. The binder resin composition claim 1, further comprising a pigment or a metal paste.

13. A method for coating a polyolefin based surface, said method comprising applying the binder resin composition of claim 1 to said surface to form a wet coated surface, drying said wet coated surface to form a coated surface.

14. The method of claim 13, further comprising applying a coating to said coated surface.

15. The binder resin composition of claim 1, wherein the carboxyl group-containing chlorinated polyolefin (I) contains an acrylic group.

16. The binder resin composition of claim 15, wherein the acrylic group is a group derived from glycidyl methacrylate.

17. The binder resin composition of claim 1, wherein the carboxyl group-containing chlorinated polyolefin (I) has a weigh average molecular weight of from 56,000 to 70,000.

18. The binder resin composition of claim 1, wherein the carboxyl group-containing chlorinated polyolefin (I) is derived from a polypropylene polymer.

* * * * *